(12) United States Patent
Sikharulidze

(10) Patent No.: US 7,670,654 B2
(45) Date of Patent: Mar. 2, 2010

(54) BISTABLE LIQUID CRYSTAL DISPLAY DEVICE

(75) Inventor: David Sikharulidze, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 901 days.

(21) Appl. No.: 11/388,332

(22) Filed: Mar. 23, 2006

(65) Prior Publication Data

US 2007/0222928 A1   Sep. 27, 2007

(30) Foreign Application Priority Data

Mar. 29, 2005   (GB) ................................ 0506193.2

(51) Int. Cl.
*G02F 1/167* (2006.01)
*G02F 1/139* (2006.01)
(52) U.S. Cl. .................. 428/1.1; 252/299.4; 349/37; 349/128; 349/166; 349/177
(58) Field of Classification Search .................. 428/1.1; 252/299.01, 299.4; 349/37, 128, 166, 177
See application file for complete search history.

(56) References Cited

U.S. PATENT DOCUMENTS

| | | | |
|---|---|---|---|
| 4,305,807 A | 12/1981 | Somlyody | |
| 4,681,404 A | 7/1987 | Okada | |
| 5,498,762 A | 3/1996 | Eguchi | |
| 5,729,320 A | 3/1998 | Eidenschink et al. | |
| 5,766,508 A | 6/1998 | Kawasumi et al. | |
| 5,796,459 A | 8/1998 | Bryan-Brown | |
| 5,956,113 A | 9/1999 | Crawford | |
| 6,727,968 B1 | 4/2004 | Bryan-Brown | |
| 7,283,196 B2 * | 10/2007 | Helgee et al. | 349/172 |
| 2001/0017685 A1 | 8/2001 | Park | |
| 2002/0196403 A1 * | 12/2002 | Kitson et al. | 349/177 |
| 2004/0144953 A1 * | 7/2004 | Sikharulidze | 252/299.01 |

FOREIGN PATENT DOCUMENTS

| | | |
|---|---|---|
| EP | 1271255 | 1/2003 |
| GB | 2324620 | 10/1998 |
| GB | 2394781 | 5/2004 |
| GB | 2404260 | 1/2005 |
| JP | 405061021 A | 3/1993 |
| WO | WO97/39382 | 10/1997 |
| WO | WO2004099343 | 11/2004 |

* cited by examiner

*Primary Examiner*—Sophie Hon

(57) ABSTRACT

A bistable nematic liquid crystal display device includes two cell walls enclosing a layer of a nematic liquid crystal material, means for applying an electric field across at least some of the layer, and means for inducing local planar alignments of said liquid crystal material at an inner surface of each cell wall. The local planar alignments are oriented to each other at an angle greater than 0° and less than 90°. The device also includes means for selectively masking an alignment effect of either of the local planar alignments by applying a unidirectional electric field pulse of suitable magnitude and duration to stabilise the device in one of two different homeoplanar configurations determined by the polarity of the pulse.

15 Claims, 5 Drawing Sheets

BISTABLE LIQUID CRYSTAL DISPLAY DEVICE

RELATED APPLICATIONS

This application for letters patent is related to and claims the benefit of an earlier filing date and right of priority of foreign filed patent application GB0506193.2, filed in the United Kingdom on Mar. 29, 2005, which is also hereby incorporated by reference.

This application for letters patent is also related to U.S. patent application Ser. No. 10/698,028, filed Oct. 31, 2003, now U.S. Pat. No. 7,264,851, which is hereby incorporated by reference.

BACKGROUND

Pixel bistability is a desirable attribute for a liquid crystal display ('LCD') because this eliminates the need constantly to refresh the display or to employ a silicon memory device behind each pixel, which becomes prohibitively expensive as the number of pixels increases. With bistability, only pixels that need to be changed need addressing, and simple matrix addressing may be employed. If the liquid crystal ('LC') can switch at video frame rates, the device may be used as an LCD TV or monitor. For other applications such as 'digital paper', where the device is used as a permanent or semi-permanent display for information which can be changed or updated from time to time, slower switching times are acceptable.

In co-pending U.S. patent application Ser. No. 10/698,028, electrophoretically-controlled nematic (EPCN) bistable devices are presented in which a 'hidden' electrophoretic effect is used to stabilise the LC in one of two stable states. The nematic LC is doped with nanoparticles carrying either a positive or a negative charge. An optical effect is observed by using a homeoplanar or 90° twist cell. The homeoplanar cell has a homeotropic alignment on one substrate and a planar alignment on an opposed substrate. The alignments are provided using different materials and different fabrication techniques, requiring some complexity in the process for fabricating the device. The 90° twisted cell switches between twist and homeoplanar states, and requires electrical pulses that control switching close to one surface. Such switching may, however, require very precise control of the electrical pulses.

BRIEF DESCRIPTION OF THE DRAWINGS

The invention will now be further described, by way of example, with reference to the following drawings in which.

DETAILED DESCRIPTION

Figure 1:
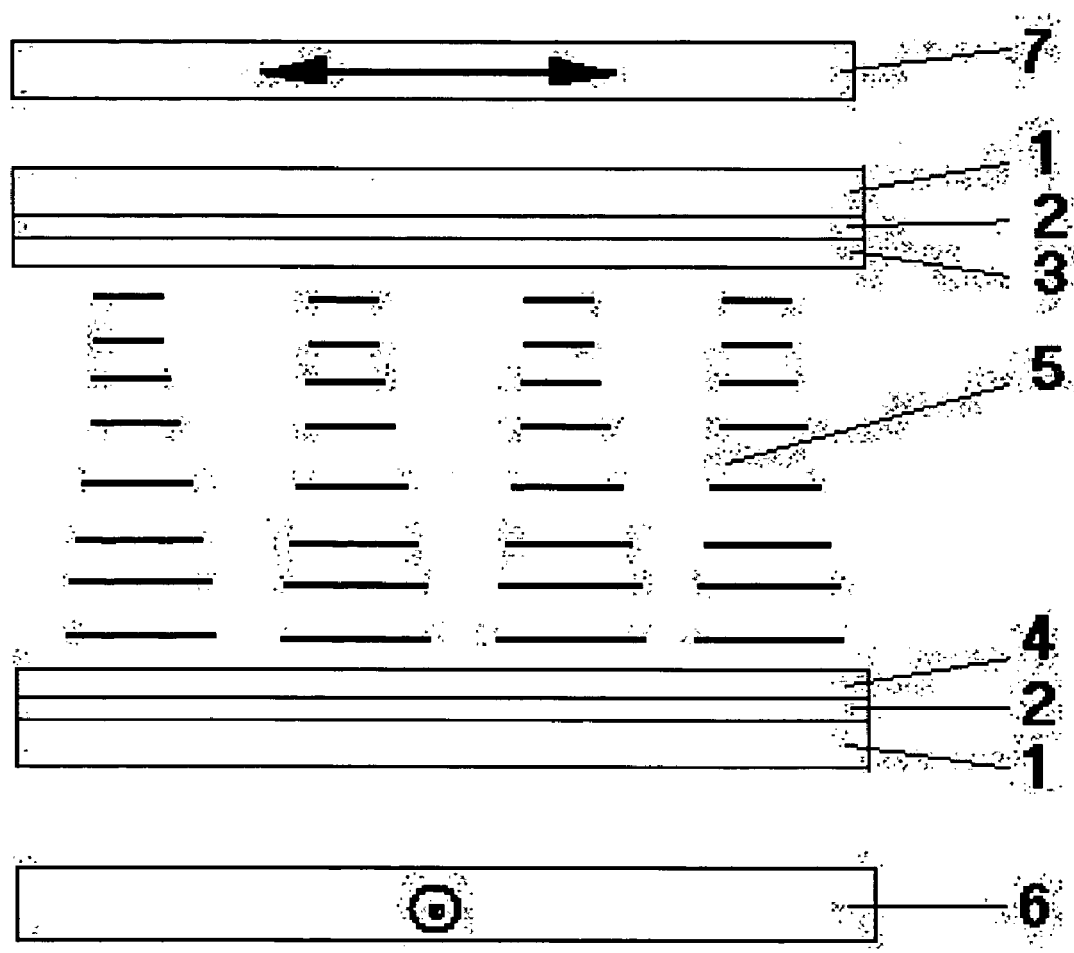
FIG. 1 shows a bistable LCD in accordance with an embodiment of the present invention.

The display device shown in FIG. 1 comprises two transparent cell walls 1 enclosing a layer of nematic LC material 5 having positive dielectric anisotropy. The LC material 5 has dispersed within it nanoparticles 12 (shown in FIG. 2) which tend to acquire either a negative or a positive charge by triboelectric charging in the LC. Each cell wall 1 has a transparent electrode 2, for example of indium tin oxide (ITO), on an inner surface thereof. The inner surface of one cell wall is provided with a first surface alignment layer 3, and the inner surface of the other cell wall is provided with a second surface alignment layer 4, each of which induces local planar alignment (parallel to the surface) in a specified azimuthal direction. The alignment direction induced by the first alignment layer 3 is at 45° to the alignment direction induced by the second alignment layer 4. In the initial state illustrated in FIG. 1, before application of an electric pulse, the nematic director twists through one-eighth of a helix between the cell walls. The cell walls 1 are placed between crossed polarizers 6, 7 in such a manner that one of the planar alignment directions is parallel (or at 90° to) one of the polarization directions, and consequently the other alignment direction is at 45° to both polarization directions.

Applying a first unipolar electrical pulse of suitable magnitude across the electrodes 2 causes the device to adopt a first homeoplanar alignment which is stable when the electric field is removed. Applying a second unipolar pulse of suitable magnitude, but opposite polarity to the first pulse, causes the device to adopt a second homeoplanar alignment at 45° degrees to the first homeoplanar alignment. This second alignment is also stable when the electric field is removed so that the device is bistably switchable between each state.

Without being bound by theory, one possible mechanism for the bistable switching is discussed below.

Applying a unipolar electrical pulse causes homeotropic alignment of the LC molecules vertically along the electric field. At the same time suitable amplitude of the electric pulse causes an electrophoretic effect, which results in a collection of charged nanoparticles close to a selected inner surface. Negatively-charged nanoparticles will collect close to the side with positive polarity or positively-charged nanoparticles will collect close to the side with negative polarity. This creates a close-packed network of solid nanoparticles with the homeotropically-aligned LC molecules close to the selected surface. After removal of the electric field, the local homeotropic alignment is retained at the selected surface by the closely-packed nanoparticles, which effectively mask the influence of the planar aligning layer at that surface. The cell adopts the homeoplanar orientation and, although it exhibits birefringence, between crossed polarizers this state is dark when the selected planar alignment is parallel to the input polarizer, as transmission $I_{transm} = I_o \sin^2 2\alpha \sin^2(\pi d \Delta n/\lambda) = 0$, because of $\alpha=0$ (or 90°), $\sin^2 2\alpha = 0$, where $I_o$ is input light, $\alpha$ is the angle between planar alignment and polarizer; d is the cell thickness; $\Delta n$ is optical anisotropy; $\lambda$ is light wavelength.

Thus, the nanoparticles are thought to function as a masking mechanism for selectively masking the alignment effect of either planar alignment by applying a unidirectional field of suitable magnitude and duration so as to stabilize the device in one of two different homeoplanar configurations determined by the polarity of the pulse.

Figure 2A:
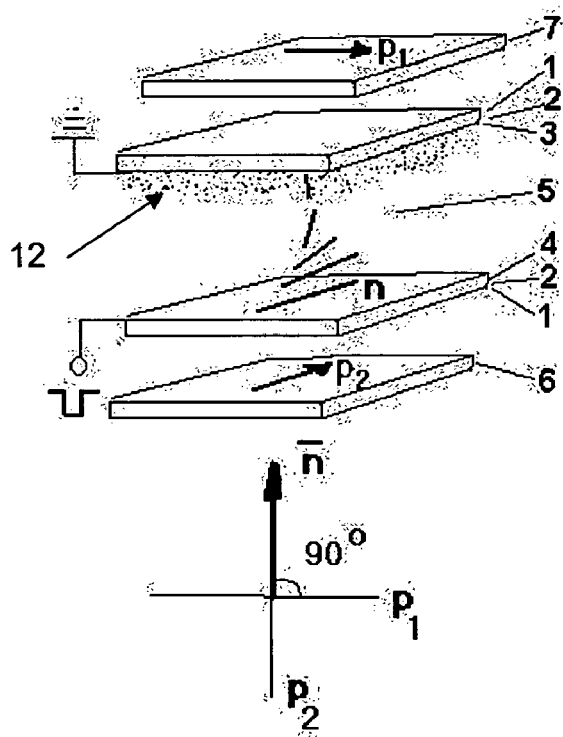
FIGS. 2a and 2b are schematic drawings showing the switching process in the device of FIG. 1.
Figure 2B:
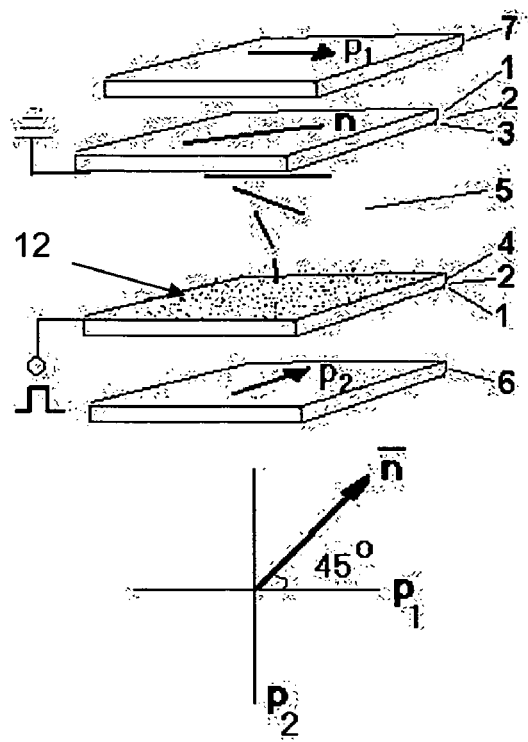

Referring now to FIGS. 2a and 2b, where P1 and P2 show respectively the polarization direction of crossed polarizers 7 and 6, and where n is the LC director orientation, the switching process is shown schematically. In FIG. 2a, a negative pulse is applied to the lower electrode 2, causing negatively-charged nanoparticles 12 to collect close to the upper alignment layer 3. The lower alignment layer 4 has an orientation parallel to the polarization direction P2 of polarizer 6, through which input light enters the cell. In this configuration the display appears dark when viewed through the crossed polarizers 6, 7. An opposite connection of the unipolar pulse produces back switching (FIG. 2b). In this case the nanoparticles migrate and collect close to the opposite side (the lower alignment layer 4) and consequently the previous local homeotropic state reverts to the planar state, and the previous local planar alignment reverts to a local homeotropic state. So again the cell adopts a homeoplanar configuration, but this second homeoplanar configuration is oriented at 45° to the polarizers. In this case the cell transmits light according to:

$I_{transm} = I_o \sin^2 2\alpha \sin^2(\pi d \Delta n/\lambda) = I_o \sin^2(\pi d \Delta n/\lambda)$, as $\alpha = 45°$, $\sin^2 2\alpha = 1$. Reversing of the applied pulse provides switching to the previous state and the cell again adopts the dark state shown in FIG. 2a. Thus in both states the cell has the same birefringence, determined by $(\pi d \Delta n/\lambda)$, but the switching between light and dark states is provided by a rotation of the director n through 45° from one azimuthal direction to another.

Experimentally the cells have been constructed from two glass or plastic substrates with transparent ITO electrodes. Both of the substrates over the ITO electrode were covered by a thin layer, providing the planar alignment. Each alignment layer induces a local nematic director orientation at 45° with respect to each other. The thickness of the cell was controlled by polymer beads and varied from 2-15 μm. Commercial nematic LCs from Merck were used: E7, E63, MLC6204-000, ZLI2293, MLC6440 and MLC6023-000. These were doped by fumed silica or aluminium oxide. The negatively charged nanoparticles were silica Aerosil® R974, R106, R812, R711, R380, OX50 with primary size 7-40 nm and positively charged silica R504 (7 nm), aluminium oxide C (13 nm) (all from Degussa-Huls). The concentration of the particles in the LC was varied from 1-15% by total weight of the composition comprising LC and nanoparticles. Unipolar pulses with amplitude 10-80 V, and duration of the pulse 0.5-50 ms were applied to the cells.

Figure 3:
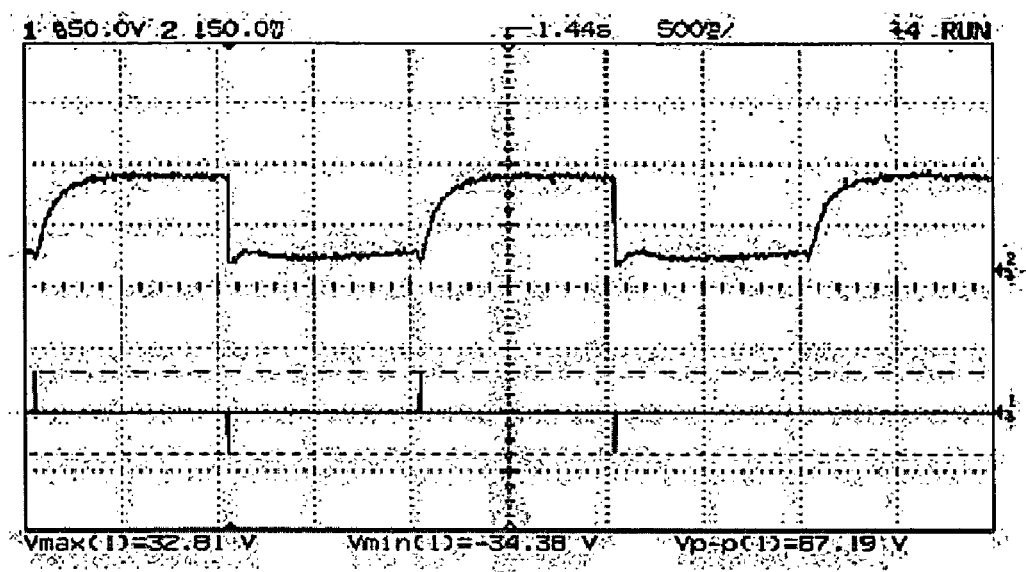
FIG. 3a is a graph of the electro-optical response for the device of FIG. 1.
FIGS. 3b and 3c are photomicrographs of dark and light states of the device of FIG. 1 corresponding to different molecular configurations.
Figure 3:
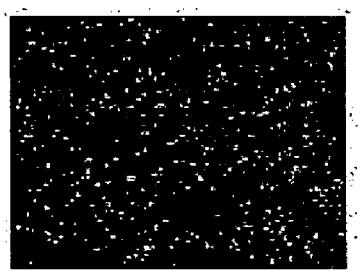
Figure 3:

FIGS. 3a, 3b and 3c show the bistable switching between dark and light states in a 5 μm cell with nematic MLC6204-000 doped with 2% silica nanoparticles R812. FIG. 3a shows optical transmittance registered by an oscilloscope, and FIGS. 3b and 3c show the corresponding dark and light states, observed under a polarizing microscope.

Figure 4:
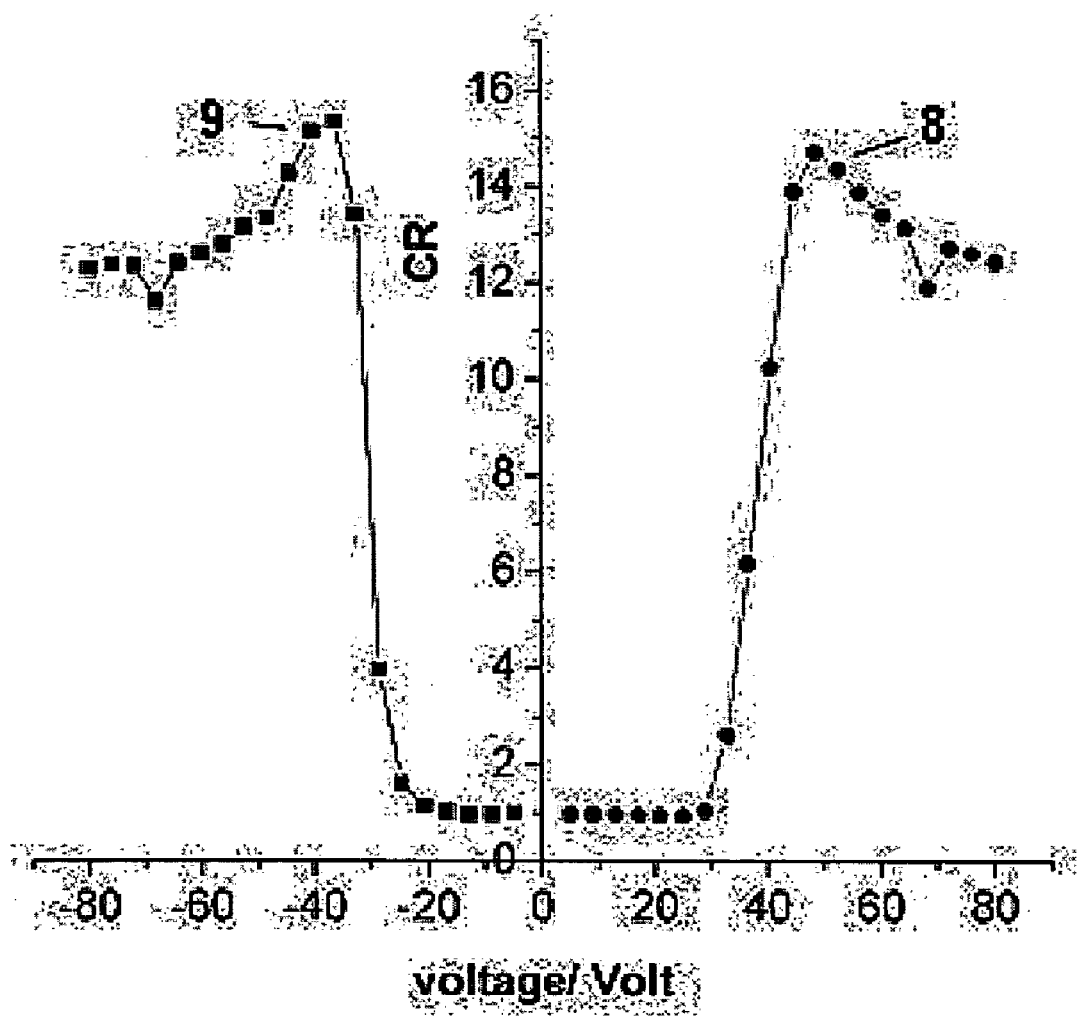
FIG. 4 is a graph showing contrast ratio for the device of FIG. 1, for pulses of different voltage and polarity.
Figure 5:
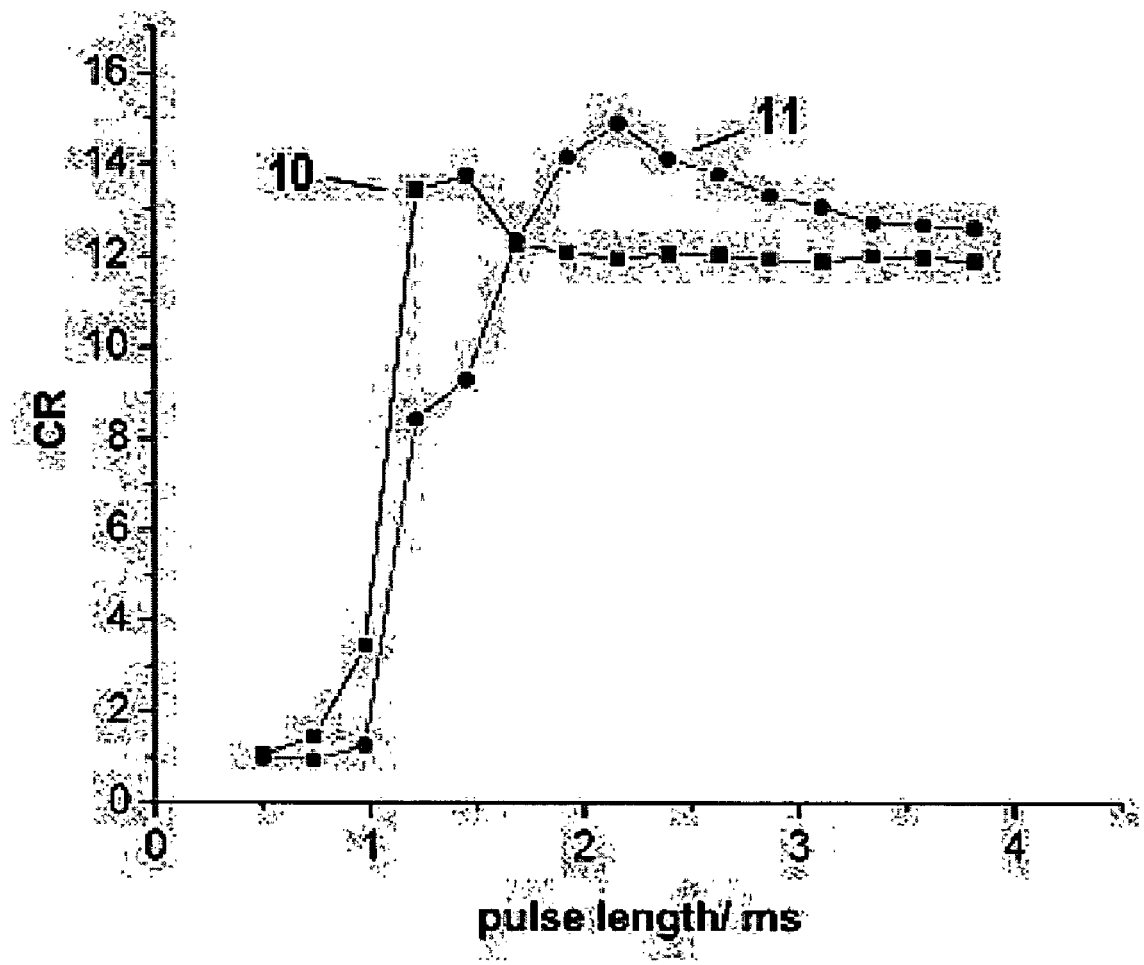
FIG. 5 is a graph showing contrast ratio for the device of FIG. 1, for different pulse lengths of each polarity.

FIG. 4 shows contrast ratio depending on the voltage of an applied electrical pulse of 4 ms duration, and FIG. 5 plots contrast ratio against pulse length for an 80 V pulse (reset pulse 80V/4 ms in both cases). Curves 8 and 10 show the switching from the initial dark state to the light state and curves 9 and 11 show the switching from the initial light state to the dark state.

A complex display may be addressed using row and column electrodes, for example, the construction of which is well known to those skilled in the art. Because of the bistability, each pixel defined by the intersection of a row and column electrode need be addressed only when its light transmission needs to be changed. The invention provides a bistable nematic display with good contrast and substantially symmetrical switching behaviour.

The display may have identical alignment conditions on both substrates (apart from the alignment direction), simplifying manufacture. In certain embodiments, optimal contrast may be provided when the angle between the planar orientations is 45°.

Switching between 45° homeoplanar states may be controlled by reversing the same electrical pulses, the parameters of which may be varied in a wide range. This simplifies the electrical driving of the device.

The term 'planar alignment' and related terms are used herein may include planar alignments which have some pre-tilt, as is commonly found in planar alignments from aligning materials such as rubbed polymer coatings.

The term 'azimuthal plane' is used herein may be defined as follows. Let the walls of a cell lie in the x,y plane, so that the normal to the cell walls is the z axis. An azimuthal plane is a plane parallel with or along the z axis. An azimuthal direction is a direction on the x,y plane within an azimuthal plane.

While the dispersed particles are referred to herein as "nanoparticles", it should be understood that this term is not meant to specifically limit the particles sizes in the claims. In certain exemplary embodiments the dispersed particles have a size in the range of about 5 to about 50 nm; however, in other embodiments particles may have a size in the range about 1 nm to about 1000 nm.

The dispersed particles may be spherical or spheroidal in shape.

The dispersed particles may be present in a concentration of from 0.1 to 25% by weight of the composition comprising the LC and the particles. In certain exemplary embodiments the concentration may be between about 1% and about 15% by weight, while in other exemplary embodiments the concentration by weight may be between about 1% and about 5%.

In an exemplary display device, drive electronics may be used to provide unidirectional (DC) pulses of appropriate magnitude, duration and polarity, in accordance with input data information. Suitable drive electronics will be well known to those skilled in the art. It will be understood that the pulses may be of constant field strength or may have an AC component, providing that the overall field strength is sufficient to effect the switching to a stable state.

In certain embodiments, the two stable states of the display device may be optically distinguished by using a single polarizer, for example a polarizer aligned with one of the alignment directions, and a dissolved pleochroic dye in the LC. Increased contrast may be obtained using crossed polarizers on either side of the LC layer, with one polarizer being parallel (or at 90°) to one of the planar alignment directions, and the other planar alignment direction being at 45° to that polarizer. In the homeoplanar alignment parallel to one of the polarizers, birefringence will likely not be observed as the device appears dark. In the homeoplanar alignment at 45° to the polarizers, birefringence may be observed as the device appears light.

In other embodiments, with two polarizers, the homeoplanar alignment parallel to one of the polarizers, birefringence will likely not be observed as the device appears dark. In the homeoplanar alignment at a non-zero angle to both polarizers, birefringence may be observed as the device appears light.

In certain embodiments, one or more polarizers may be affixed to or otherwise provided adjacent an outside surface of each cell wall.

In certain embodiments, for optimal ON-state brightness the angle between the planar orientations may be 45°; however it will be understood that the display device may also be constructed with different angles between the planar orientations, by way of example only, angles between 10-80°, 20-70°, 30-60°, or 40-50° may be employed.

What is claimed is:

1. A bistable liquid crystal display device comprising:
two cell walls enclosing a layer of a nematic liquid crystal material having finely-divided solid particles dispersed therein;

at least one electrode on each cell wall for applying an electric field across at least some of the liquid crystal material;

a first surface alignment layer on an inner surface of one cell wall for inducing adjacent molecules of the liquid crystal material to adopt a first planar orientation in a first specified azimuthal direction, and a second surface alignment layer on an inner surface of the other cell wall for inducing adjacent molecules of the liquid crystal material to adopt a second planar orientation in a second specified azimuthal direction at an angle greater than 0° and less than 90° to the first planar orientation;

wherein the liquid crystal material adopts a first stable homeoplanar alignment in response to a first pulse of a unidirectional electric field of suitable magnitude and duration via the electrodes and adopts a second stable homeoplanar alignment in response to a second pulse of opposite polarity to the first pulse, the first homeoplanar alignment being in a same azimuthal plane as the first planar orientation and the second homeoplanar alignment being in a same azimuthal plane as the second planar orientation.

2. A device according to claim 1, wherein the angle between the first planar orientation and the second planar orientation is substantially 45°.

3. A device according to claim 1, further comprising a first polarizer on one side of the layer of the liquid crystal material and a second polarizer on the other side of the layer of the liquid crystal material, the first polarizer having a polarization direction aligned with the first planar orientation and the second polarizer having a polarization direction substantially at 90° to that of the first polarizer.

4. A device as claimed in claim 1, wherein the particles have a size in the range about 1 to about 1000 nm.

5. A device as claimed in claim 1, wherein the particles have a size in the range about 5 to about 50 nm.

6. A device as claimed in claim 1, wherein the particles comprise at least one material selected from a group of materials comprising silica, alumina, clay, and titanium dioxide.

7. A device as claimed in claim 1, wherein the particles are silica particles.

8. A device as claimed in claim 1, wherein the particles are present in a concentration of from about 0.1% to about 25% by total weight of a composition comprising the liquid crystal material and the particles.

9. A device as claimed in claim 8, wherein the particles are present in a concentration of from about 1 to about 15% by weight of said composition.

10. A device as claimed in claim 8, wherein the particles are present in a concentration of from about 1 to about 5% by weight of said composition.

11. A bistable liquid crystal display device comprising:

two translucent cell walls enclosing a layer of a nematic liquid crystal material having finely-divided solid particles dispersed therein;

at least one electrode on each cell wall for applying an electric field across at least some of the liquid crystal material;

a first surface alignment layer on an inner surface of one cell wall for inducing adjacent molecules of the liquid crystal material to adopt a first planar orientation in a first specified azimuthal direction, and a second surface alignment on an inner surface of the other cell wall for inducing adjacent molecules of the liquid crystal material to adopt a second planar orientation in a second specified azimuthal direction at an angle greater than 0° and less than 90° to the first planar orientation;

a first polariser and a second polariser substantially parallel with the cell walls and with the layer of the layer of the liquid crystal material inbetween;

the first polariser having a first polarisation direction parallel with one of said planar orientations, and the second polariser having a second polarisation direction at substantially 90° to the first polarisation direction;

wherein the liquid crystal material adopts a first stable homeoplanar alignment in response to a first pulse of a unidirectional electric field of suitable magnitude and duration via the electrodes and adopts a second stable homeoplanar alignment in response to a second pulse of opposite polarity to the first pulse, the first homeoplanar alignment being in a same azimuthal plane as the first planar orientation and the second homeoplanar alignment being in a same azimuthal plane as the second planar orientation.

12. A device according to claim 11, wherein an angle between the first planar orientation and the second planar orientation is substantially 45°.

13. A bistable nematic liquid display comprising:

two cell walls inclosing a layer of a nematic liquid crystal material;

means for applying an electric field across at least some of said layer;

means for inducing local planar alignments of said liquid material at an inner surface of each cell wall, said local planar alignments being oriented to each other at an angle greater than 0° and less than 90° and wherein one of the local planar alignments is in a first specified azimuthal direction and the other local planar alignment is in a second specified azimuthal direction; and means for selectively masking an alignment effect on either of said local planar alignments by applying a unidirectional electric field pulse of suitable magnitude and duration so as to stabilize the device in one of two different homeoplanar configurations determined by a polarity of said pulse, wherein the nematic liquid crystal material adopts a first stable homeoplanar alignment in response to a first unidirectional electric field pulse of stable magnitude and duration and adopts a second stable homeoplanar alignment in response to a second pulse of opposite polarity to the first pulse, the first homeoplanar alignment being in a same azimuthal plane and direction as one of said local planar alignments and the second homeoplanar alignment being in a same azimuthal plane and direction as the other local planar alignment.

14. A device according to claim 13, wherein said means for selectively masking comprises finely-divided charged particles dispersed within the liquid crystal material.

15. A device according to claim 13, wherein an angle between the first planar orientation and the second planar orientation is substantially 45°.

* * * * *